United States Patent [19]

Rubner et al.

[11] Patent Number: 4,708,019
[45] Date of Patent: Nov. 24, 1987

[54] MEASUREMENT OF STRAIN EMPLOYING A PIEZORESISTIVE BLEND OF A DOPED ACETYLENE POLYMER AND AN ELASTOMER

[75] Inventors: Michael Rubner, Chelmsford; Enid K. Sichel, Lincoln, both of Mass.

[73] Assignee: GTE Laboratories Incorporated, Waltham, Mass.

[21] Appl. No.: 624,946

[22] Filed: Jun. 27, 1984

[51] Int. Cl.[4] ............................................. G01B 7/16
[52] U.S. Cl. ....................................... 73/760; 252/500
[58] Field of Search ............... 73/760, 763, 781, 721; 338/2, 4, 5; 252/500, 511, 518, 520

[56] References Cited

U.S. PATENT DOCUMENTS

| 2,734,978 | 2/1956 | Bulgin | 338/2 |
| 3,469,441 | 9/1969 | Pohl | 252/500 |
| 3,719,913 | 3/1973 | DuBose et al. | 338/2 |
| 3,808,678 | 5/1974 | Kubo et al. | 338/5 |
| 4,076,652 | 2/1978 | Ganci et al. | 252/511 |
| 4,222,903 | 9/1980 | Heeger | 252/518 |
| 4,394,304 | 7/1983 | Wnek | 252/520 |
| 4,510,075 | 4/1985 | Lee et al. | 252/518 |
| 4,510,076 | 4/1985 | Lee et al. | 252/518 |

FOREIGN PATENT DOCUMENTS 720602 12/1954 United Kingdom .

OTHER PUBLICATIONS

Weymouth, Leon J., "Strain Gages", pp. 8-4 to 8-5.
MacDiarmid, A. G. and Heeger, A. J., "Organic Metals and Semiconductors: The Chemistry of Polyacetylene, $(CH)_x$, and its Derivatives", Synthetic Metals 1, 101-118 (1979/80).
Rubner, M. F., Tripathy, S. K., Georger, J., Cholewa, P., "Structure-Property Relationships of Polyacetylene/Polybutadiene Blends", Macromolecules 16, 870-875 (1983).
Galvin, M. E., Wnek, G. E., "Electrically Conductive Polymer Composites; Polymerization of Acetylene in Polyethylene", Polymer 23, 795-7, 1982.

Primary Examiner—Stewart J. Levy
Assistant Examiner—Robert R. Raevis
Attorney, Agent, or Firm—Hamilton, Brook, Smith & Reynolds

[57] ABSTRACT

Methods and pressure transducers for measuring strain as a result of stress applied to a sample are disclosed. These pressure transducers include polymeric elements comprising a piezoresistive blend of a doped acetylene polymer and an elastomer.

9 Claims, 5 Drawing Figures

MEASUREMENT OF STRAIN EMPLOYING A PIEZORESISTIVE BLEND OF A DOPED ACETYLENE POLYMER AND AN ELASTOMER

TECHNICAL FIELD

This invention is in the field of strain measurement and in particular relates to the measurement of strain employing an improved polymeric pressure transducer.

BACKGROUND ART

A strain gauge is a device for measuring dimensional change primarily on the surface of a specimen as the latter is subjected to mechanical, thermal, or a combination of both stresses. One type of strain gauge is attached to the specimen surface and amplifies mechanically the surface distortion so that the change can be measured on a simple dial indicator. Other types of strain gauges measure the displacement of light rays through an optical system that is actuated by the surface strain, or convert this strain into an electrical signal. The mechanical, electro-mechanical, and optical strain gauge devices are considered extensometers, and their use generally is limited to materials properties testing, or as calibration tools.

The electrical type of strain gauge is in wide use today and has found applications far beyond those of a conventional extensometer. Electrical-type strain gauges may be based upon the measurement of a capacitance, an inductance, or a resistance change that is proportional to strain.

The principle of a resistance-type strain gauge can be illustrated with a conductor in rod shape. As the rod is elongated in response to tensile stress, the length of the rod increases and its cross-sectional area decreases to produce a resistance increase when the basic resistivity of the material remains reasonably constant. The resistance change, $\Delta R/R$, is related to the length change, $\Delta L/L$, or strain, by the strain sensitivity or gauge factor.

Most commercially available strain gauges are rigid structures based upon metals or semiconductor materials. Metallic strain gauges typically have gauge factors in the range of about 2.0 to 4.5, whereas semiconductor-type strain gauges may have gauge factors as high as 150.

Such strain gauges are adequate for measuring strain in rigid structures, such as bridges, buildings, machine parts, etc. There are certain applications, nevertheless, for which such rigid strain gauges are inadequate. For example, such rigid gauges have proven to be inadequate for measuring strains in biological tissues, such as ligament strains. Typical rigid strain gauges fail when they are subjected to strains of greater than about 2 percent, but loaded ligaments are estimated to be capable of strains of 30 percent before reaching their yield point. See Kennedy, J. C. et al., *J. Bone & Joint Surg.* 58-A(3), 350-355, 1976. In addition, the rigidity of metal and semiconductor gauges is so great that such gauges could alter the properties of any soft tissue onto which they are bonded. Thus, there is a need for what might be referred to as soft strain gauges.

DISCLOSURE OF THE INVENTION

This invention relates to Applicants' discovery that certain piezoresistive blends of doped acetylene polymers and elastomers can be employed in the measurement of strain due to stress applied to a sample. Pressure transducers, such as strain gauges, can be fabricated employing such blends. These transducers contain a polymeric element capable of deformation in response to stress applied to the sample. The polymeric element comprises a piezoresistive blend of an acetylene polymer doped to make it electrically conductive and an elastomer. Means for applying an electrical field across the polymeric element and means for detecting a change in electrical resistance of the polymeric element in response to stress applied to the sample also form part of these improved pressure transducers.

It is also possible to form the polymeric element from blends of an acetylene polymer and an elastomer containing a sufficiently high percentage of doped acetylene polymer to produce blends that undergo irreversible plastic deformation. Such blends may be used as disposable fuses in applications where it is necessary to control excessive forces exerted on a system.

Electrically conductive polymer blends comprising a foamed polymer matrix and an acetylene polymer may also be prepared. Such foams typically have gauge factors higher than non-foamed blends.

Pressure transducers formed from blends of a doped acetylene polymer and an elastomer take advantage of the electrical resistance sensitivity of such blends to dimensional changes, and do not suffer from the disadvantages of rigid strain gauges based upon metals or semiconductors. It is possible using the blends described herein to produce strain gauges which will operate with strains as high as 80 percent. Such strain gauges can be produced with a wide range of gauge factors simply by varying the composition of the blends. The large strains that these materials are capable of handling also can be useful in providing a recorded output of a time varying strain such as that produced by a vibrating or flexing component.

BEST MODE FOR CARRYING OUT THE INVENTION

Figure 1:
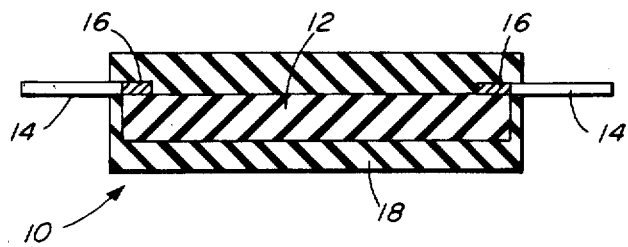
FIG. 1 is a side-elevational view of a strain gauge according to this invention.

A strain gauge 10 according to this invention is illustrated in FIG. 1. Strain gauge 10 contains a polymeric element 12 comprising a piezoresistive blend of a doped acetylene polymer and an elastomer. Metal leads and/or connecting terminals 14 are secured to polymeric element 12 by adhesive 16 which is electrically conductive. An example of a suitable adhesive is conductive silver epoxy. Polymeric element 12 can be electrically connected to a measuring instrument, such as an ohmmeter, using connectors 14. A non-conducting protective coating 18 is used to insulate polymeric element 12 from the surface or system to which it is attached. Coating or encapsulation 18 also provides mechanical and environmental protection for the strain gauge and connections. An example of a suitable material for encapsulation coating 18 is polyisoprene which can be applied by solution casting techniques.

The means for attaching the strain gauge 10 to a sample under investigation depends upon the particular sample and its configuration. In many cases, standard bonding agents and methods can be employed. Once attached to a sample or structure, a tensile strength applied to the sample results in a stretching of the piezoresistive film 12 thereby lengthening the film and reducing its cross sectional area. This, in turn, results in a change in resistance of the film which can be measured by an ohm-meter or other means to provide a correlation between strain experienced by the sample and change in electrical resistance of piezoresistive element 12.

Although the piezoresistive element 12 in FIG. 1 has the shape of a film, other shapes can be produced. For example, polyblends made according to this invention can be shaped using conventional elastomer technology into diaphragms, fibers, and many other shapes.

The term elastomers is used herein to include the complete spectrum of elastic or rubber-like polymers which are sometimes randomly referred to as rubbers, synthetic rubbers, or elastomers. Some common elastomers are derived from the following materials: acrylates, butyls, fluorocarbons, fluorosilicones, sulfides, urethanes, neoprenes, isoprenes, nitriles, silicones, butadienes, styrene butadienes, etc.

The acetylene polymer can be introduced into the elastomer by techniques based upon those previously employed in forming blends of polyacetylene in other matrices. See, e.g.: Rubner, M. F. et al. *Macromolecules* 16, 870, 1983. For instance, the elastomer can be dissolved in a solvent containing a polymerization catalyst. Solvent can then be removed, such as with the aid of a vacuum, to form a film of the elastomer containing catalyst on the walls of the container. Acetylene gas can then be introduced into the container at temperatures sufficient for polymerization to occur within the elastomer.

Alternatively, acetylene gas can be bubbled through the solution of elastomer and catalyst and films of the polyblend can be subsequently cast from the reaction mixture and dried in vacuum. See Lee, K. I. and Jopson, H., *Poly. Bull.* 10, 105-108, 1983.

Suitable catalysts for acetylene polymerization include the Shirakawa catalyst. See Ito, T. et al. *J. Polym. Chem. Polym. Chem. Ed.* 12, 11, 1974. A specific example of a suitable Shirakawa catalyst is one formed by adding 1.7 ml titanium tetrabutoxide, $Ti(OC_4H_9)_4$, and 2.7 ml triethylaluminum, $Al(C_2H_5)_3$, to 20 ml of toluene.

The temperature of polymerization is controlled so that acetylene diffuses into and polymerizes within the elastomer. Generally, lower temperatures are employed than has been usual in the formation of previously described polyacetylene blends. As a general matter, temperatures from about $-78°$ C. up to about room temperature are preferred, although higher temperatures can be employed in preparing suitable blends according to this invention.

Doping is carried out to a level sufficient to make the blends electrically conductive. For purposes of this invention, electrically conductive means an electrical conductivity of at least about $10^{-6}$ ohm$^{-1}$cm$^{-1}$.

Doping with electron donors or electron acceptors is performed according to art-recognized techniques. Such techniques include exposing the polyblends to iodine vapor or to a solution consisting of iodine dissolved in a solvent, such as nitromethane; exposing the polyblend to a solution consisting of $FeCl_3$ dissolved in nitromethane or other solvent; or electrochemically doping the polyblend with a solution consisting of lithium perchlorate dissolved in a solvent such as nitromethane. A more detailed description of such procedures is given in MacDiarmid, A. G. and Heeger, A. J., "Organic Metals and Semiconductor: the Chemistry of Polyacetylene, $(CH)_x$, and its Derivatives," *Synthetic Metals*, 1, (1979-80) 101-18, the teachings of which are hereby incorporated by reference.

Whereas polyacetylene is described above, and the experimental results also employ polyacetylene, other polymers of acetylene can be employed. For example, co-polymers containing polyacetylene can also be employed in producing the electrically conducting polymer blends of this invention.

Blends can be formed which undergo reversible elastic or irreversible plastic deformation. Blends containing from about 5 to about 40 weight percent acetylene polymer typically undergo reversible elastic deformation with stress. Blends with acetylene polymer contents greater than about 40 weight percent typically undergo irreversible plastic deformation with stress. Blends which undergo irreversible plastic deformation with stress are useful as disposable fuses.

Suitable blends, in addition to containing an acetylene polymer and elastomer, must also be piezoresistive. Thus, they must be doped, as described above, to make the blend electrically conductive. Further, the resistance of the blend must be sensitive to changes in geometry or strain.

In another embodiment, blends were prepared starting with foamed elastomers. These blends exhibited much higher gauge factors, typically in the range of 10-30. Blends employing foamed elastomers were prepared by swelling elastomer foams with solvents and subsequently soaking the swollen elastomer with a Luttinger catalyst. See Luttinger, L. B., *Chem. Ind.* (*London*) 36, 1135, 1960. The Luttinger catalyst, in general, contain $NaBH_4/Co(NO_3)_2 \cdot 6H_2O$ dissolved in a polar solvent. Such catalysts have been shown to effectively catalyze the polymerization of acetylene gas. See Lieser, G. et al. *Makrolmol. Chem. Rapid Commun.* 1, 621, 1980. The swollen catalyst-impregnated foams were then washed to remove excess catalyst and acetylene gas was introduced under vacuum conditions. Exposure to gas was maintained until the desired amount of polyacetylene had formed on the outer surfaces of the pores of the foam material. The foam blends were then doped with a suitable electron-donor or electron-acceptor using standard procedures.

The Luttinger catalyst is preferred in the case of blends prepared from a foam or cellular elastomer because it employs polar solvents which do not solvate most elastomers. Shirakawa catalysts, on the other hand, contain non-polar solvents which tend to dissolve the elastomer and thereby destroy its sponge-like structure.

The invention will now be further and more specifically illustrated by the following examples.

EXAMPLE 1

BLEND OF POLYACETYLENE AND POLYISOPRENE WHICH UNDERGOES IRREVERSIBLE STRAIN

All solvents were dried and distilled under argon. Acetylene was bubbled through a glass-packed sulfuric acid tower followed by passage through a KOH/3 Å molecular sieve column and a cold trap (dry ice/acetone cooled) prior to use. A $Ti(OBu)_4/Et_3Al$ catalyst was prepared according to the methods Ito et al., *J.*

Polym. Chem. Polym. Chem. Ed. 12, 11, 1974. A stock catalyst mixture was prepared containing 1.7 ml of Ti(OBu)$_4$ and 2.7 ml of Et$_3$Al and 20 ml of toluene. Polyisoprene having an average molecular weight of about 200,000 was employed. Iodine was also used as received. All manipulations were carried out by using vacuum line techniques or in an inert atmosphere.

2.5 grams of polyisoprene was dissolved in 25 ml of toluene. 1.0 ml of the stock catalyst solution was then added. The solution was thoroughly mixed and the reaction vessel was placed under a dynamic vacuum to remove toluene. This resulted in a uniform coating on the walls of the reaction vessel consisting of polyisoprene impregnated with catalyst. Acetylene gas was introduced at room temperature and a pressure of 1 atm. Exposure to acetylene gas was continued for 48 hours during which time the coating on the reactor vessel walls changed from brown to gold. The resultant blend was washed with cold ($-78°$ C.) heptane and dried at $10^{-3}$ torr for 8 hours.

The resulting film was doped by exposing it to a solution of iodine dissolved in dry nitromethane (0.002 mole/100 ml). Excess dopant was washed off the film with pure nitromethane and the film was placed in dynamic vacuum for one hour to remove residual solvent.

A resistance-strain curve was obtained by placing the blend in a stretching apparatus and subjecting the material to known strains. The resistance of the blend was monitored with an ohmmeter connected via pressure contacts to the ends of the blend. Sample dimensions were 0.35 cm wide and 0.01 cm thick.

Figure 2:
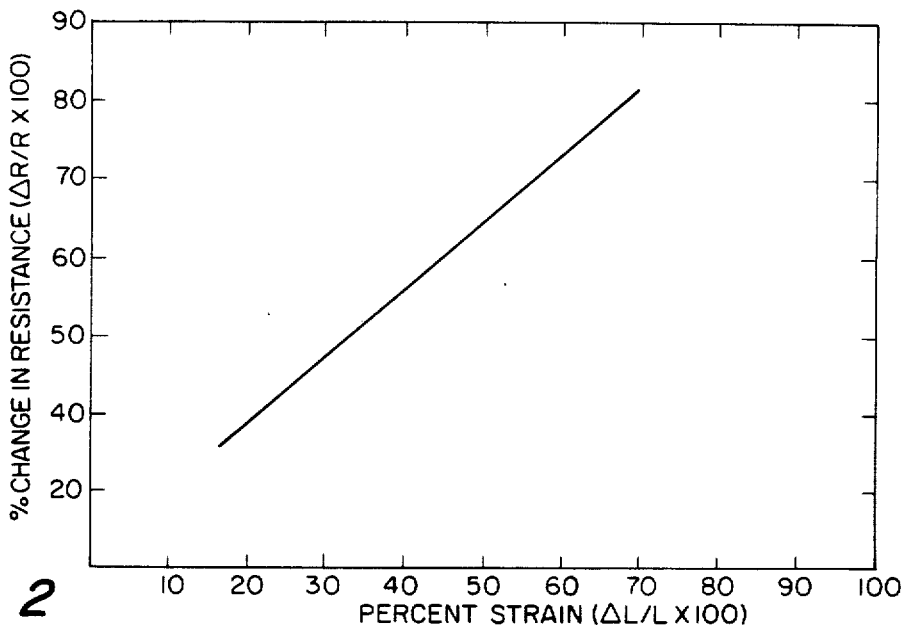
FIGS. 2-5 are plots illustrating the change in electrical resistance with strains for blends according to this invention.

The resultant resistance-strain curve is illustrated in FIG. 2. The sample underwent irreversible strain and had a gauge factor of 1.2.

EXAMPLE 2

BLEND OF POLYACETYLENE AND POLYISOPRENE WHICH UNDERGOES REVERSIBLE STRAIN

Figure 3:
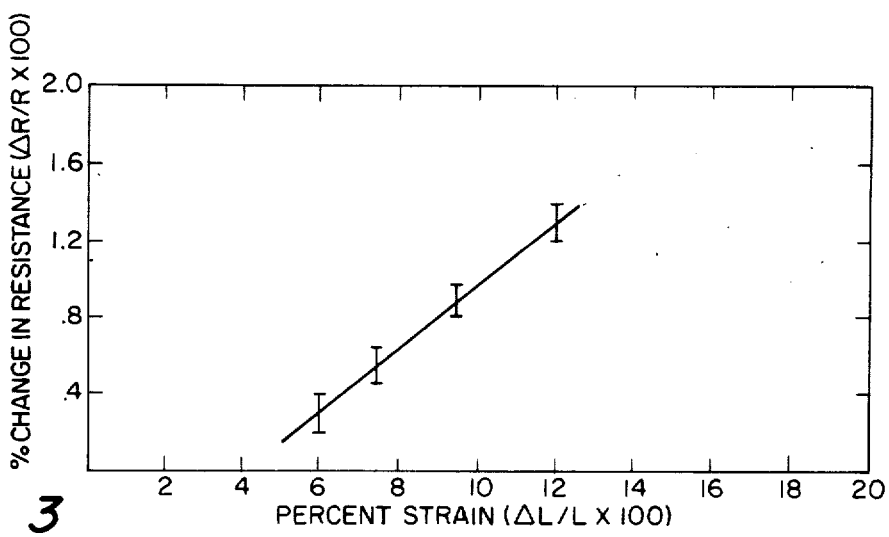

The materials and procedures of Example 1 were employed except that 2.0 grams of polyisoprene was employed with 1.5 ml of the stock catalyst solution and exposure to acetylene gas was continued for 24 hours. A resistance-strain plot for the film produced is shown in FIG. 3. This film had a gauge factor of 0.13 and underwent reversible strain in the linear range.

The error bars on the figure represent the range of values obtained during repeated strain cycles. For the most part, these are due to hysteresis of the rubbery component of the blend.

EXAMPLE 3

BLEND OF POLYACETYLENE AND POLY(STYRENE-BUTADIENE-STYRENE) TRIBLOCK WHICH UNDERGOES REVERSIBLE STRAIN

Figure 4:
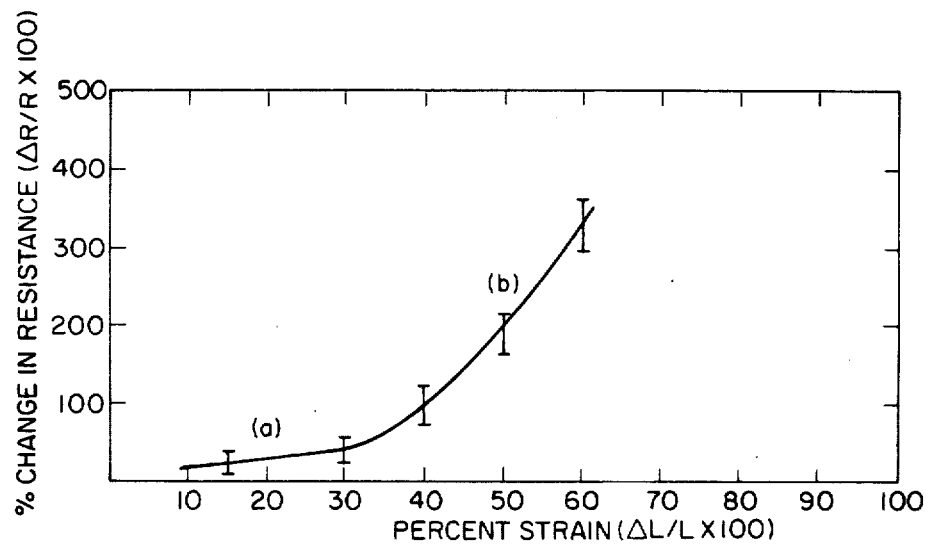

The procedure, materials and methods of Example 1 were employed except as follows. 2.5 grams of poly(styrene-butadiene-styrene) triblock polymer, obtained from Shell Oil Co. under the tradename Kraton, was employed with 1.5 ml of the stock catalyst solution. Exposure to acetylene gas was continued for 2 hours. The resistance strain curve for this film is illustrated in FIG. 4. As can be seen, the curve has two linear portions, indicated on FIG. 4 as (a) and (b). The gauge factor for portion (a) was 1.3 and for the portion (b) was 3.1. It underwent reversible strain in both cases.

EXAMPLE 4

BLEND OF POLYACETYLENE AND OPEN-CELLED NEOPRENE FOAM

Luttinger catalyst was prepared as follows. 0.1 gram of cobalt nitrate was dissolved in 10 ml ethanol. Separately, 0.2 gram of sodium borohydride was dissolved in 25 ml ethanol and 25 ml ether. Each was cooled to $-78°$ C., and combined and maintained at dry ice/acetone temperatures.

A strip of No. 510 neoprene rubber (open cell) obtained from Green Rubber Company of Cambridge, Mass. was added to a 3-neck round bottom flask. The flask was then evacuated and 10 ml of toluene was syringed into the flask to swell the rubber. The foam was allowed to soak for 10 minutes in the toluene after which excess toluene was removed and the flask was cooled to $-78°$ C. Ten ml of catalyst was syringed into the flask and allowed to soak into the rubber for 5 minutes. Excess catalyst was then syringed from the rubber and the procedure of adding catalyst and removing the excess catalyst was repeated three times at $-78°$ C.

The rubber was then washed with ethanol to remove excess catalyst and a partial vacuum was then pulled in the flask. The flask was flushed with acetylene for about 30 minutes. For the first 2-3 minutes exposure was at $-78°$ C. The temperature was subsequently raised to room temperature. The rubber was washed with ethanol to remove residue catalyst after which the rubber was dried.

Iodine doping was done as in Example 1.

Figure 5:
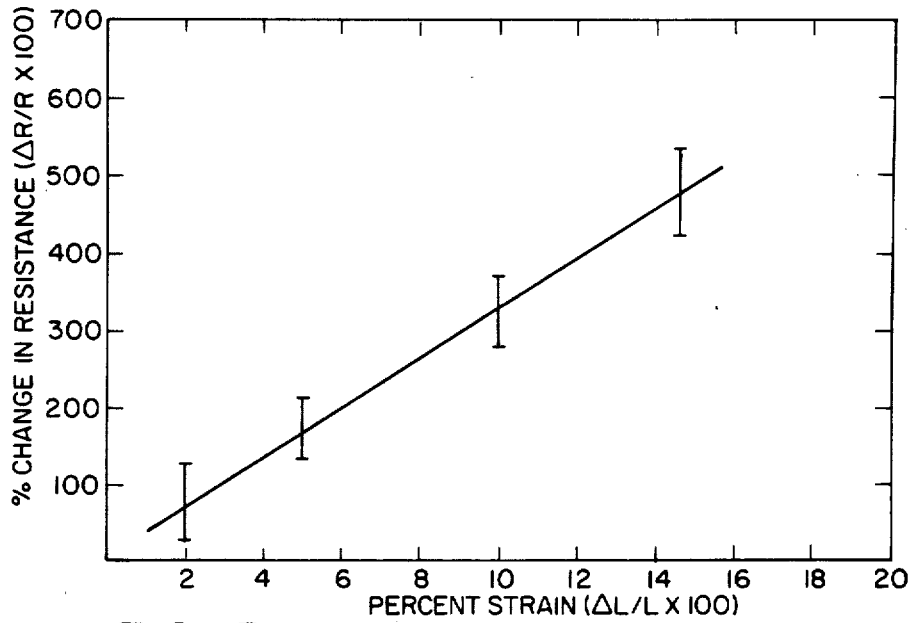

A resistance-strain curve for the film produced is shown in FIG. 5. This film had a gauge factor of 30.

Industrial Applicability

The invention described herein relates to the formation of pressure transducers, useful in such applications as strain gauges, from blends of doped polyacetylene and elastomers. Such pressure transducers are useful in measuring strain, pressure, impact, acceleration and other force related variables.

Equivalents

Those skilled in the art will recognize or be able to ascertain, using no more than routine experimentation, many equivalents of the specific embodiments of the invention described herein. Such equivalents are intended to be encompassed by the following claims.

We claim:

1. A method for measuring strain resulting from stress applied to a sample, comprising:
    a. applying an encapsulated piezoresistive polymer file to said sample, said film consisting essentially of an elastomer having a doped electrically conductive polyacetylene uniformly and homogeneously blended throughout the elastomer, the polyacetylene being formed by polymerizing acetylene gas in the presence of a catalyst;
    b. applying an electric field across said piezoresistive polymer film; and
    c. detecting a change in electrical resistance in said piezoresistive polymer film in response to stress applied to the sample.

2. A method of claim 1 wherein said elastomer comprises polybutadiene.

3. A method of claim 1 wherein said elastomer comprises polyisoprene.

4. In the measurement of strain in response to stress applied to a sample, including the steps of applying a strain gauge to the sample and subsequently detecting the change in electrical resistance of the strain gauge in response to stress applied to the sample: an encapsulated piezoresistive polymer film consisting essentially of an elastomer having a doped electrically conductive polyacetylene uniformly and homogeneously blended throughout the elastomer, the polyacetylene being formed by polymerizing acetylene gas in the presence of a catalyst.

5. A pressure transducer for measuring strain in response to stress applied to a sample, comprising in combination:
   a. an encapsulated piezoresistive polymer film applied to such sample, said film consisting essentially of an elastomer having a doped electrically conductive polyacetylene uniformly and homogeneously blended throughout the elastomer, the polyacetylene being formed by polymerizing acetylene gas in the presence of a catalyst;
   b. means for applying an electric field across said piezoresistive polymer film.

6. A pressure transducer of claim 5 wherein said elastomer comprises polybutadiene.

7. A pressure transducer of claim 5 wherein said elastomer comprises polyisoprene.

8. A pressure transducer of claim 5 wherein said elastomer comprises a foamed elastomer.

9. A pressure transducer of claim 8 wherein said foamed elastomer comprises open-celled neoprene rubber.

* * * * *

UNITED STATES PATENT AND TRADEMARK OFFICE
CERTIFICATE OF CORRECTION

PATENT NO. : 4,708,019
DATED : November 24, 1987
INVENTOR(S) : Michael Rubner and Enid K. Sichel It is certified that error appears in the above—identified patent and that said Letters Patent is hereby corrected as shown below:

Claim 1, column 6, line 54, "file" should read ---film---.

Claim 4 should read:

4. In the measurement of strain in response to stress applied to a sample, including the steps of applying a strain gauge to the sample and subsequently detecting the change in electrical resistance of the strain gauge in response to stress applied to the sample: the improvement wherein said strain gauge comprises an encapsulated piezoresistive polymer film consisting essentially of an elastomer having a doped electrically conductive polyacetylene uniformly and homogeneously blended throughout the elastomer, the polyacetylene being formed by polymerizing acetylene gas in the presence of a catalyst.

Signed and Sealed this

Twenty-first Day of June, 1988

Attest:

DONALD J. QUIGG

Attesting Officer     Commissioner of Patents and Trademarks